(12) United States Patent
Altschul et al.

(10) Patent No.: US 6,527,192 B1
(45) Date of Patent: Mar. 4, 2003

(54) ORDER SELECTION DEBIT CARD AND METHOD

(75) Inventors: Randice-Lisa Altschul, Cliffside Park; Lee S. Volpe, Mount Laurel, both of NJ (US)

(73) Assignee: Dieceland Technologies Corp., Cliffside Park, NJ (US)

( * ) Notice: Subject to any disclaimer, the term of this patent is extended or adjusted under 35 U.S.C. 154(b) by 0 days.

(21) Appl. No.: 09/660,131

(22) Filed: Sep. 12, 2000

(51) Int. Cl.$^7$ ............................................. G06K 19/00
(52) U.S. Cl. ...................... 235/487; 235/492; 705/15; 705/26
(58) Field of Search .................. 235/380, 381, 235/487, 493, 492; 705/15, 26, 27

(56) References Cited

U.S. PATENT DOCUMENTS

| | | | | |
|---|---|---|---|---|
| 4,128,757 A | * | 12/1978 | Garner | 235/383 |
| 4,415,065 A | * | 11/1983 | Sandstedt | 705/34 |
| 4,530,067 A | * | 7/1985 | Dorr | 705/15 |
| 4,808,805 A | * | 2/1989 | Harers | 235/490 |
| 5,235,509 A | * | 8/1993 | Mueller et al. | 705/15 |
| 5,424,524 A | * | 6/1995 | Ruppert et al. | 235/383 |
| 5,834,747 A | * | 11/1998 | Cooper | 235/449 |
| 5,857,079 A | * | 1/1999 | Claus et al. | 235/308 |
| 5,884,281 A | * | 3/1999 | Smith et al. | 705/26 |
| 5,905,246 A | * | 5/1999 | Jajkowski | 235/375 |
| 5,965,848 A | | 10/1999 | Altschul et al. | 174/254 |
| 5,969,968 A | * | 10/1999 | Pentel | |

FOREIGN PATENT DOCUMENTS

JP    56-137460    * 10/1981

* cited by examiner

*Primary Examiner*—Diane I. Lee
(74) *Attorney, Agent, or Firm*—Arthur Jacob

(57) ABSTRACT

A method and an order debit card enable the compilation of an order for items and quantities selected from a plurality of items and quantities available in the card and the transfer of information pertaining to the compiled order to a vendor at a remote site so as to avoid the necessity for compiling the order at the vendor's site, thereby avoiding delay. In addition, a given value is available in the card enabling the advance placement of the compiled order, and the value of the compiled order is deducted from the given value to establish a current given value in the card subsequent to placement of the compiled order.

13 Claims, 8 Drawing Sheets

ORDER SELECTION DEBIT CARD AND METHOD

The present invention relates generally to the selection and placement of orders for items and pertains, more specifically, to an order selection debit card and method enabling the advance selection of items to be ordered from a particular provider of items.

The proliferation of vendors of goods and services at shopping malls, at shopping districts and at frontages along roadways frequented by more and more purchasers has led to congestion and concomitant delays in making purchases at these various shopping facilities. Thus, customers often encounter long lines at stores and restaurants located at such venues. In particular, patrons at restaurants, and especially at fast-food outlets, can become vexed as a result of delays occasioned by the many purchasers waiting to place orders and make payment for completed orders.

The present invention provides an order selection debit card and method enabling an order for selected items to be specified and even paid for in advance, remote from the premises of the provider of the items, to facilitate delivery of the completed order at the provider's facility, thereby eliminating the greatest sources of delay. As such, the present invention attains several objects and advantages, some of which are summarized as follows: Enables the selection of items for purchase from a particular provider, and payment for the selected items, in advance of arriving at the point of purchase so as to avoid delays ordinarily encountered in making the selections and payment at the point of purchase; facilitates the selection of items in an order, and payment for the order, for attaining exceptional convenience, particularly in the placement of orders from a menu of items offered by restaurants and fast-food outlets, and in effecting payment for the order; eliminates the greatest source of delay at various provider sites; encourages purchases from vendors who offer the convenience of advanced selection of items in an order, and advanced payment for the order; allows increased sales volumes at existing facilities without a concomitant increase in delays and without requiring substantial modification of the existing facility; eases congestion at frequented sales outlets for greater sales appeal at these outlets; facilitates the handling of orders and sales, as well as record-keeping procedures associated with such orders and sales, to the benefit of both the patron and the vendor.

The above objects and advantages, as well as further objects and advantages, are attained by the present invention which may described briefly as an order selection debit card for placing an order compiled from selections available at the order selection debit card for subsequent filling of the order at a provider site placed at a remote location, the order selection debit card comprising: a card body having an obverse face; a display arrangement on the obverse face, the display arrangement including a selection display corresponding to a plurality of items available for selection and a plurality of quantities of each item available for selection; a selector on the card body for choosing selected items and quantities from the available items and quantities; a value memory in the card body for storing information pertaining to a given value available in the card; a compiler in the card body for compiling a compiled order in response to the selector, in accordance with the selected items and quantities; an order information transfer device in the card body for transferring order information pertaining to the compiled order from the card body to the provider site; a calculator in the card body for determining a compiled value of the compiled order based upon the selected items and quantities; and a comparator in the card body for comparing the compiled value to the given value available in the card to determine if the given value is sufficient to meet the compiled value for release of the compiled order to the order information transfer device and, upon placement of the compiled order, to deduct the compiled value from the given value and establish in the value memory a current given value available in the card subsequent to placement of the compiled order.

In addition, the invention includes a method for placing an order compiled from selections available at an order selection debit card for subsequent filling of the order at a provider site placed at a remote location, the method comprising: providing a display arrangement on the card, the display arrangement including a selection display corresponding to a plurality of items available for selection and a plurality of quantities of each item available for selection; selecting items and quantities from the available items and quantities; storing information pertaining to a given value available in the card in a value memory in the card; compiling in the card a compiled order in response to the selection of items and quantities, in accordance with the selected items and quantities; determining a compiled value of the compiled order based upon the selected items and quantities; comparing the compiled value to the given value available in the card to determine if the given value is sufficient to meet the compiled value for release of the compiled order and transfer of order information pertaining to the compiled order from the card to the provider site; and deducting the compiled value from the given value to establish in the value memory a current given value available in the card subsequent to placement of the compiled order.

The invention will be understood more fully, while still further objects and advantages will become apparent in the following detailed description of preferred embodiments of the invention illustrated in the accompanying drawing, in which.

Figure 1:
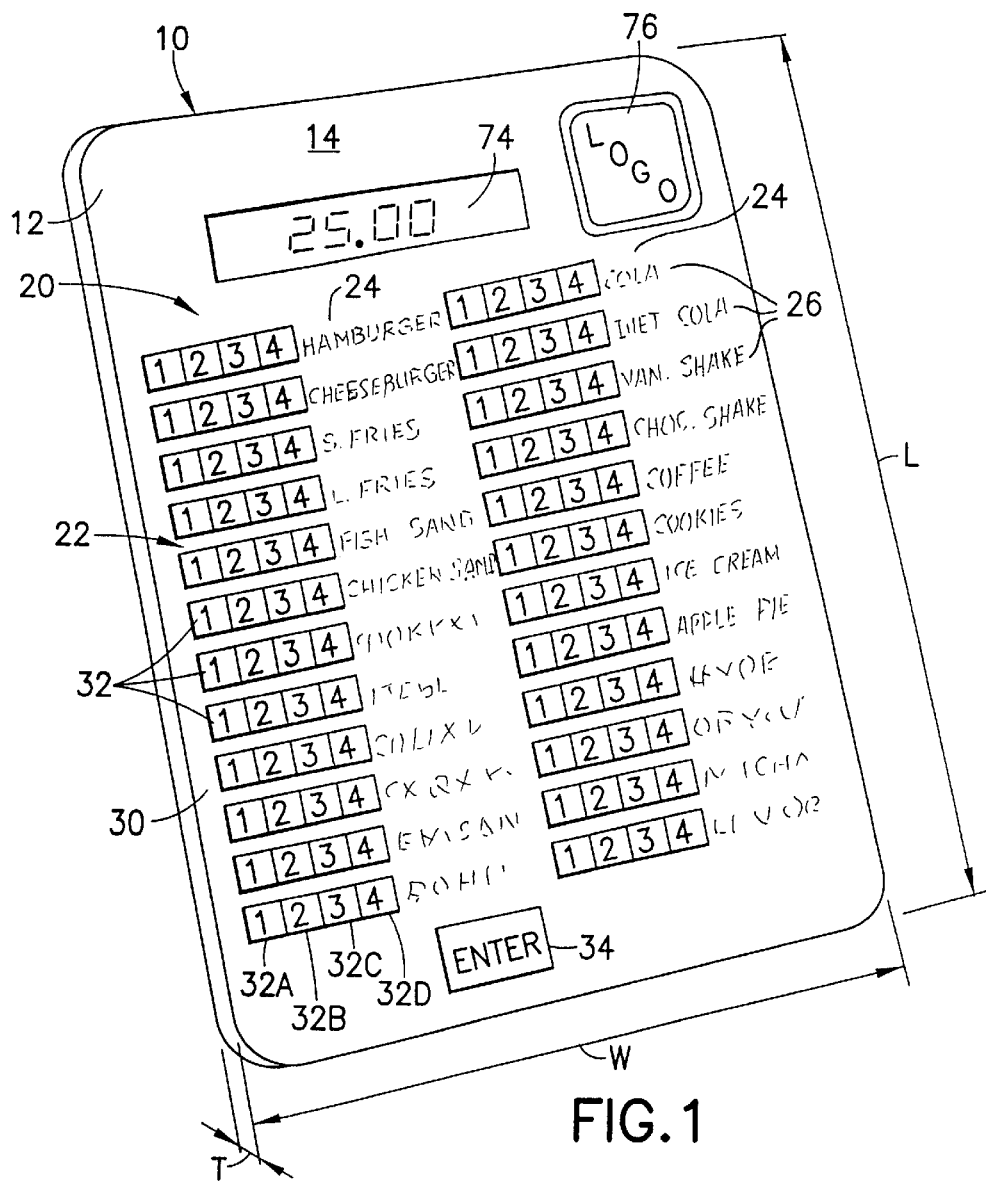
FIG. 1 is a front pictorial perspective view of an order selection debit card constructed in accordance with the present invention.
Figure 2:
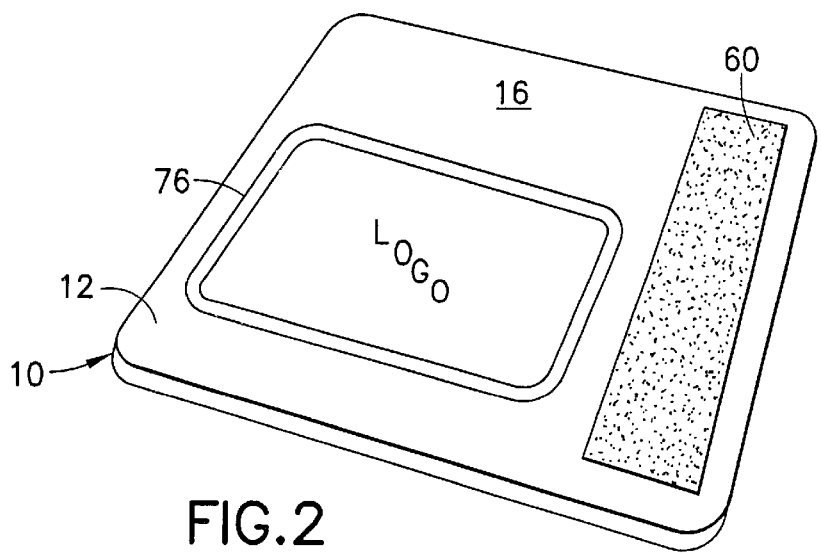
FIG. 2 is a rear pictorial perspective view of the card.

Referring now to the drawing, and especially to FIGS. 1 and 2 thereof, an order selection debit card constructed in accordance with the present invention is shown at 10 and is seen to include a card body 12 having an obverse face 14 and a reverse face 16. Card 10 is very compact, having limited dimensions which include a limited length L of about four inches, a limited width W of about three inches, and a limited thickness T of a fraction of an inch, similar to the thickness of a commonly available credit card, all made possible by a construction technique described fully in U.S. Pat. No. 5,965,848, granted to Altschul et al., the substance of which is incorporated herein by reference thereto.

A display arrangement 20 on the obverse face 14 of the card 10 includes a selection display 22 corresponding to a plurality of items available for selection. In the illustrated embodiment, card 10 is a menu order card obtained from a fast-food outlet and the selection display 22 includes a menu 24 listing of all of the items 26 offered in the menu of the fast-food outlet. A selector on the card body 12 is shown in the form of a keypad 30 having a plurality of selectors in the form of keys 32 corresponding to each of the items 26 on the menu 24. In the illustrated arrangement, multiple keys 32A, 32B, 32C and 32D are associated and juxtaposed with each item 26, so that each key 32 represents not only a selectable item 26, but a selectable quantity of the chosen item 26. In placing an order, a patron merely selects the appropriate key 32 representing each item 26 of the order and the quantity of each selected item 26, and depresses each selected key 32 to compile the order.

Figure 3:
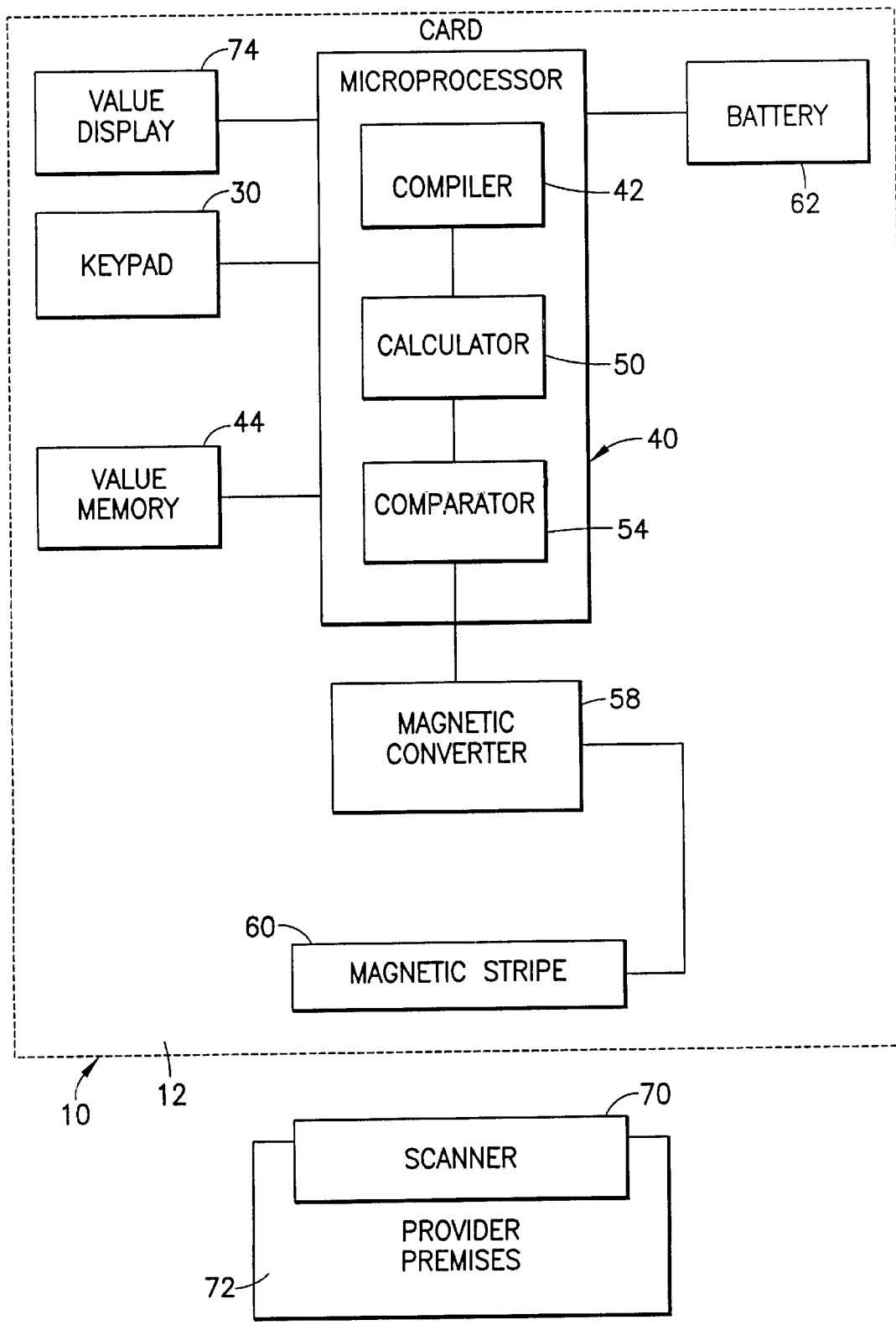
FIG. 3 is a schematic diagram showing the operating circuitry of the card.
Figure 4:
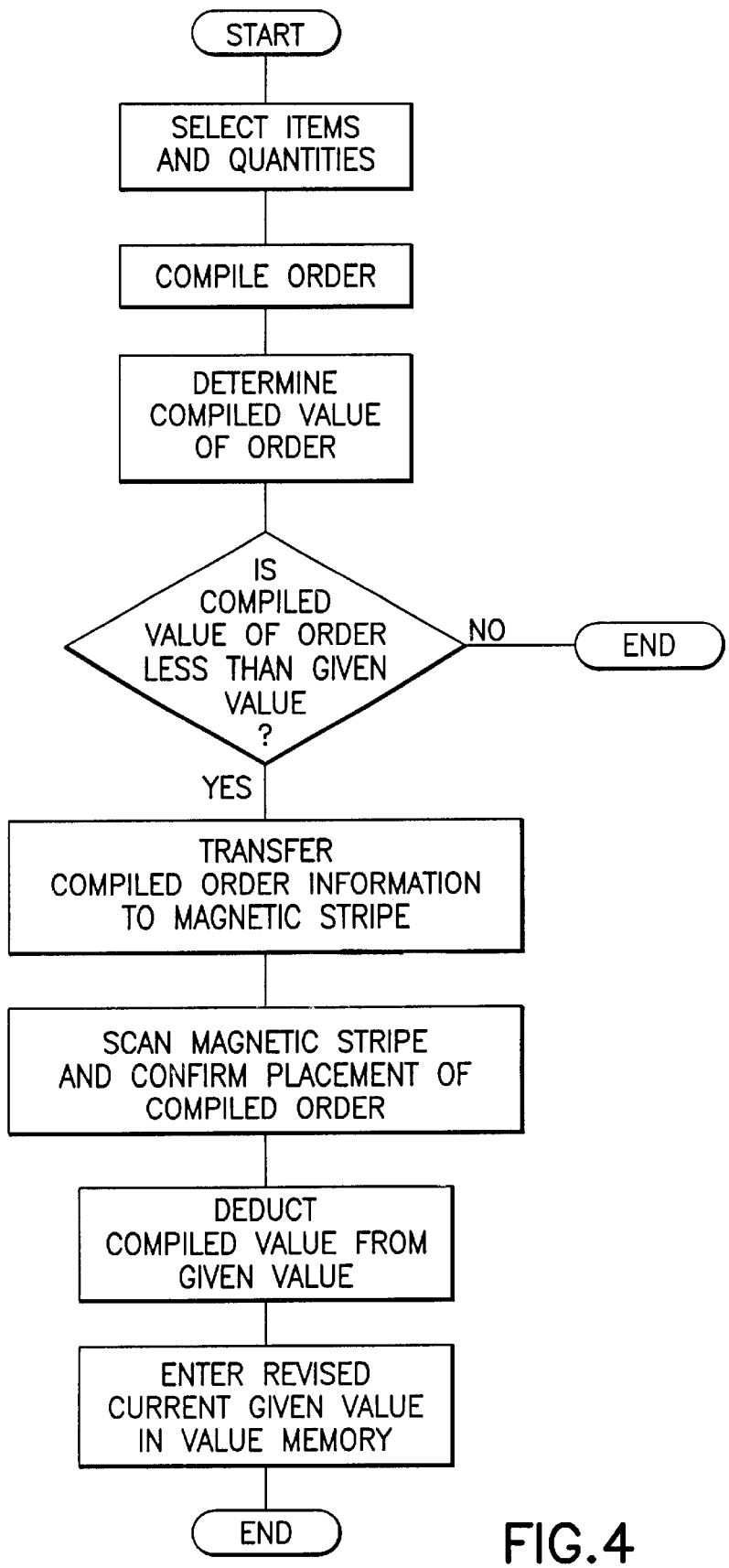
FIG. 4 is a flow chart demonstrating the operation of the card.

Turning now to FIGS. 3 and 4, as well as to FIGS. 1 and 2, a microprocessor 40 within the card body 12 of card 10 includes a compiler 42, the compiler 42 being responsive to the keypad 30 for compiling the order in accordance with the selections made at the keypad 30 as to both the chosen items 26 and the chosen quantity of each selected item 26. Card 10 is a debit card and, as such, is provided with a given monetary value. The given value is stored within a value memory 44 in the card body 12. In response to an enter key 34, the compiled order is forwarded to a calculator 50 in the card body 12 for determining a compiled value of the compiled order, and a comparator 54 in the card body 12 compares the compiled value to the given value available in the card 10 to determine if the given value available in the card 10 is sufficient to meet the compiled value and, if so, information pertaining to the compiled order is released to an order information transfer device which, in the illustrated embodiment, includes a magnetic converter 58 and a magnetic stripe 60 located on the reverse face 16 of the card body 12. Upon release of the compiled order to the magnetic converter 58, the magnetic converter 58 provides the magnetic stripe 60 with order information pertaining to the compiled order. A battery 62 in the card body 12 serves as a power source for the operating circuitry within the card 10, so that the card 10 is completely self-contained and is readily available for use.

With the information pertaining to the compiled order now available at the magnetic stripe 60, the compiled order is placed by bringing the card 10 to the fast-food outlet where magnetic stripe 60 is scanned at a scanner 70 located on the premises 72 of the fast-food outlet. Scanner 70 is of a type now well-known in which the magnetic stripe 60 is swiped across a reader (not shown) to extract the information made available at the magnetic stripe 60. In the preferred arrangement, the compiled value is deducted from the given value in response to confirmation of the placement of the compiled order to establish in the value memory 44 a revised current given value available in the card 10 subsequent to placement of the compiled order. Preferably, the display arrangement 20 includes a value display 74 for displaying the current given value available in the card 10. The order is filled and delivered without any delay which might have been introduced by having to compile an order at the premises 72 of the fast-food outlet and then make payment for the compiled order before the order is filled and delivered. Thus, the ability to compile the order in advance avoids having to wait at the provider's premises while the order is compiled, thereby avoiding congestion on the premises and concomitant delay. In addition, the ability to effect payment of the order in advance further reduces delay and enables the order to be delivered quickly and efficiently.

Card 10 may be sold to patrons by a vendor for specific amounts reflected in the given value placed in the memory 44, or may be offered as a premium to promote and facilitate transactions at the vendor's site. The body 12 of card 10 provides ample surface area for the location of identifying graphics, such as indicia and logos 76, to assist in promoting the vendor's goods or services. In view of the relatively inexpensive manufacture and distribution available for utilization in connection with card 10, once the given value is exhausted, card 10 may be discarded. In the alternative, value may be added to the memory 44 to replenish the given value for further use of the card 10.

Figure 5:
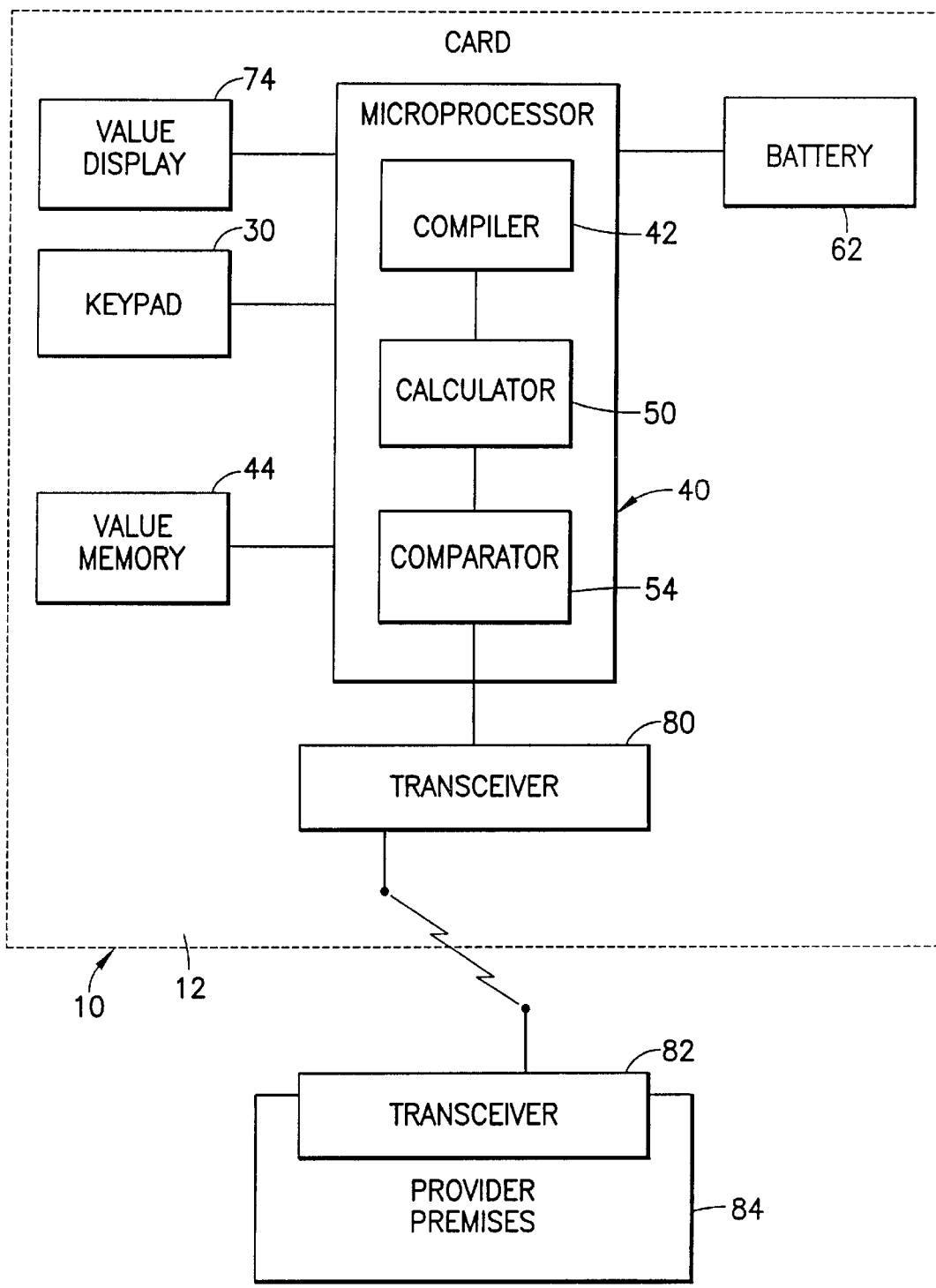
FIG. 5 is a schematic diagram showing an alternate operating circuitry.
Figure 6:
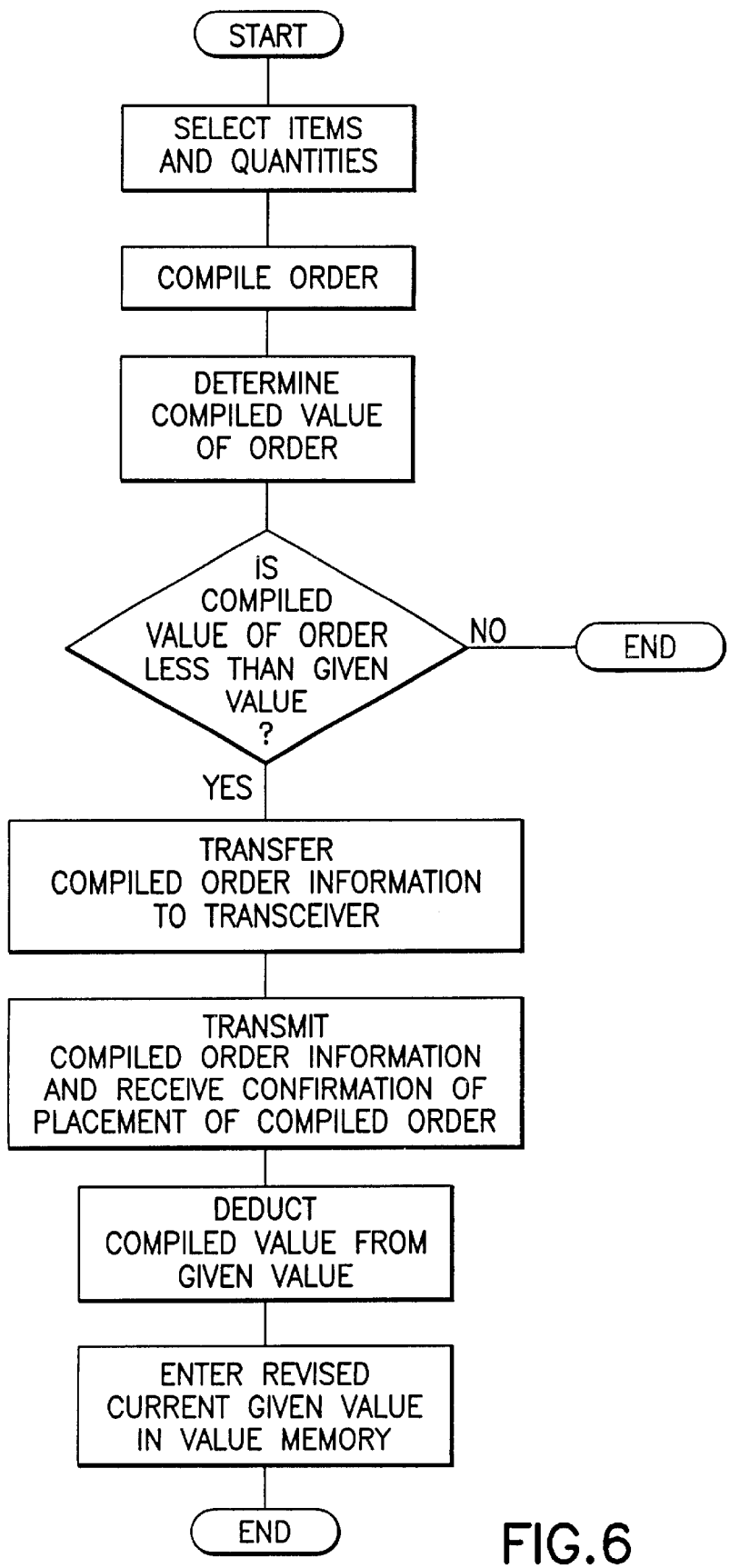
FIG. 6 is a flow chart demonstrating the operation of the alternate operating circuitry.

In the embodiment illustrated in FIGS. 5 and 6, the order information transfer device includes a transceiver 80, rather than the magnetic converter 58 and the magnetic stripe 60, for transmitting the information pertaining to the compiled order to a remote transceiver 82 at the provider's premises 84. Transceiver 80 is a radio frequency transceiver which transmits a radio frequency signal to the transceiver 82 over distances which do not require the physical connection required between the magnetic stripe 60 and the scanner 70. In this manner, the compiled order is delivered without the need for the patron to directly address a scanner 70 at the vendor's facility, thereby further reducing congestion at the vendor's premises and avoiding concomitant delay. The information pertaining to the compiled order can be transmitted utilizing other signals, such as infrared or ultrasonic signals, through the employment of an appropriate transmission and reception devices. Remote transceiver 82 acknowledges and confirms placement of the compiled order through a return signal to transceiver 80, and the compiled value is deducted from the given value in response to confirmation of the placement of the compiled order.

Figure 7:
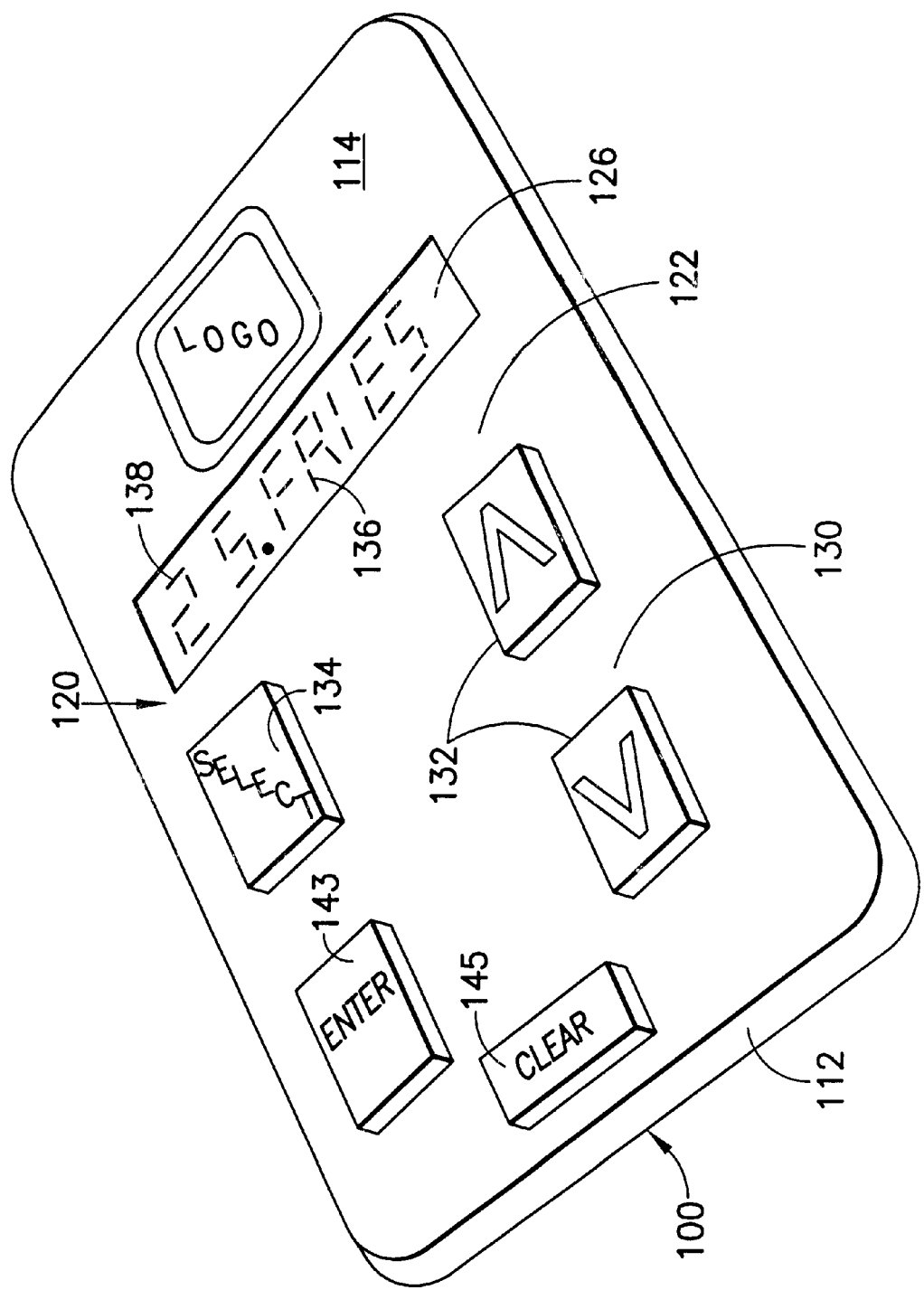
FIG. 7 is a front pictorial perspective view of another order selection debit card constructed in accordance with the present invention.
Figure 8:
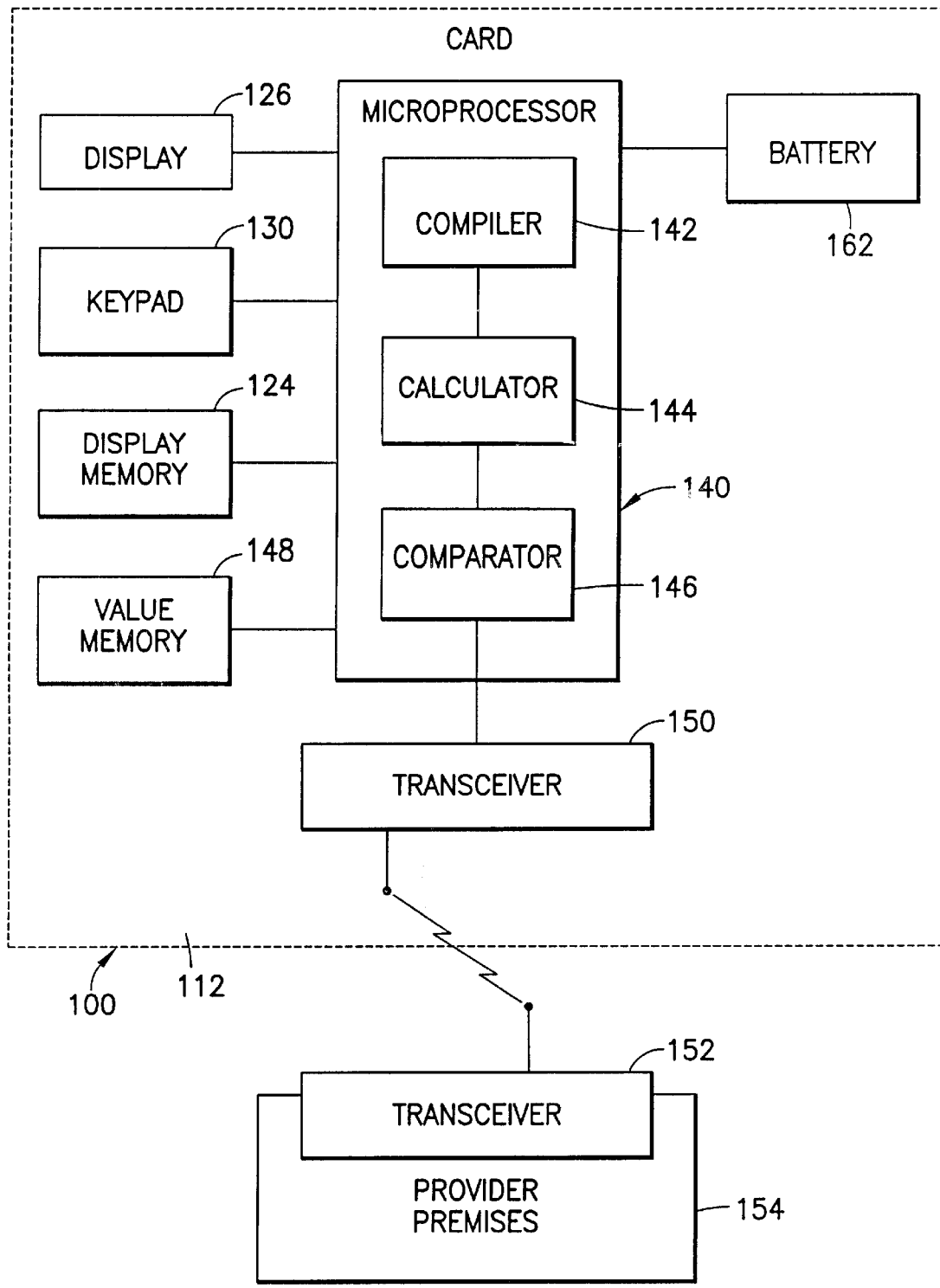
FIG. 8 is a schematic diagram showing the operating circuitry of the card of FIG. 7.
Figure 9:
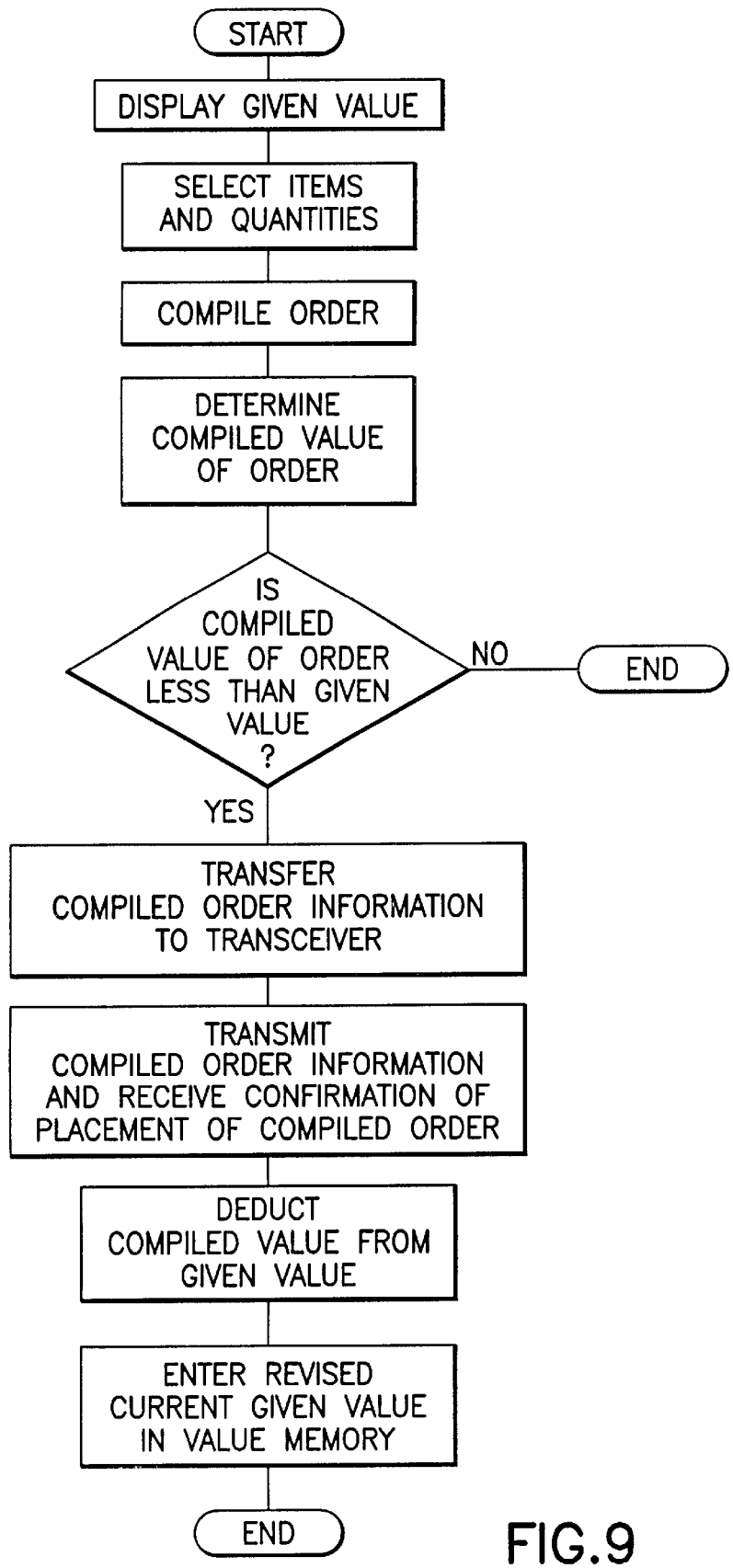
FIG. 9 is a flow chart demonstrating the operation of the operating circuitry of the card of FIG. 7.

Referring now to FIGS. 7 through 9, another embodiment of the present invention is illustrated in the form of order selection debit card 100 having a card body 112 with an obverse face 114. A display arrangement 120 includes a selection display 122 having a display memory 124 within the card body 112, and an alphanumeric visual display 126, such as an LCD display, viewable at the obverse face 114. A selector in the form of a keypad 130 includes scroll controls in the form of scroll keys 132, and a select key 134. Information pertaining to the plurality of items available for compiling an order is stored in the display memory 124. In response to operation of the scroll keys 132 the plurality of items is displayed sequentially at the alphanumeric visual display 126, as illustrated by item 136, accompanied by a quantity indication at 138, under the control of a microprocessor 140. Upon viewing the desired item 136 and quantity 138 in the alphanumeric visual display 126, the select key 134 is actuated to choose each desired item 136 and quantity 138 for compilation in an order.

A compiler 142 within the microprocessor 140 compiles the order in response to an enter key 143 of the keypad 130 and, as described in connection with the embodiment of FIGS. 1 and 2, a calculator 144, within microprocessor 140, determines a compiled value of the compiled order, based upon the selected items 136 and quantities 138. Should the patron desire to delete a particular selected item prior to completing the compiled order, a clear key 145 may be actuated when that particular selected item appears in the alphanumeric visual display 126 to delete the particular selected item from those items which will appear in the completed compiled order. A comparator 146 within the microprocessor 140 compares the compiled value to a given value in a value memory 148 and, if the given value is sufficient to meet the compiled value, releases the compiled order to an order information transfer device in the form of a transceiver 150 for transmission of the order information to another transceiver 152 remote from the card 110, located at the remote site 154 of the provider of the goods or services being ordered. Preferably, transceiver 150 transmits a radio frequency signal which is received by the remote transceiver 152. The remote transceiver 152 then sends a signal to the transceiver 150 acknowledging and confirming placement of the order, and microprocessor 140 effects a deduction of the compiled value from the given value to establish a revised current given value in the value memory 146. The value available in the card 110 is displayed at the alphanumeric visual display 126 at the start of each order session and subsequently may be called-up selectively through operation of the scroll keys 132. A battery 162 in the card body 112 serves as a power source for the operating circuitry within the card 100, so that the card 100 is completely self-contained and is readily available for use.

It will be seen that the present invention attains the several objects and advantages summarized above, namely: Enables the selection of items for purchase from a particular provider, and payment for the selected items, in advance of arriving at the point of purchase so as to avoid delays ordinarily encountered in making the selections and payment at the point of purchase; facilitates the selection of items in an order, and payment for the order, for attaining exceptional convenience, particularly in the placement of orders from a menu of items offered by restaurants and fast-food outlets, and in effecting payment for the order; eliminates the greatest source of delay at various provider sites; encourages purchases from vendors who offer the convenience of advanced selection of items in an order, and advanced payment for the order; allows increased sales volumes at existing facilities without a concomitant increase in delays and without requiring substantial modification of the existing facility; eases congestion at frequented sales outlets for greater sales appeal at these outlets; facilitates the handling of orders and sales, as well as record-keeping procedures associated with such orders and sales, to the benefit of both the patron and the vendor.

It is to be understood that the above detailed description of preferred embodiments of the invention is provided by way of example only. Various details of design, construction and procedure may be modified without departing from the true spirit and scope of the invention, as set forth in the appended claims.

The embodiments of the invention in which an exclusive property or privilege is claimed are defined as follows:

1. An order selection debit card for placing an order compiled from selections available at the order selection debit card for subsequent filling of the order at a provider site placed at a remote location, the order selection debit card comprising:

a card body having an obverse face;

a display arrangement on the obverse face, the display arrangement including a selection display corresponding to a plurality of items available for selection and a plurality of quantities of each item available for selection;

a selector on the card body for choosing selected items and quantities from the available items and quantities;

a value memory in the card body for storing information pertaining to a given value available in the card;

a compiler in the card body for compiling an order in response to the selector, in accordance with the selected items and quantities;

an order information transfer device in the card body for transferring order information pertaining to the compiled order from the card body to the provider site at the remote location to place the compiled order and for receiving a confirmation of the placement of the confirmed order;

a calculator in the card body for determining a compiled value of the compiled order based upon the selected items and quantities; and a comparator in the card body for comparing the compiled value to the given value available in the card to determined if the given value is sufficient to meet the compiled value for release of the compiled order to the order information transfer device, for releasing the compiled order to the information transfer device for placement of the compiled order upon determining that the given value is sufficient to meet the compiled value and, upon placement of the compiled order and response to receiving the confirmation of the placement of the confirmed order, to deduct the compiled value from the given value and establish in the value memory a current given value available in the card subsequent to placement of the compiled order.

2. The invention of claim 1 wherein the selection display includes a plurality of indicia on the obverse face of the card body, and the selector includes selector keys juxtaposed with corresponding indicia for enabling the choice of the selected items and quantities from the plurality of items and quantities displayed by the indicia.

3. The invention of claim 1 wherein the transceiver is a radio frequency transceiver.

4. The invention of claim 1 wherein the display arrangement includes a value display for displaying the current given value available in the card.

5. The invention of claim 1 wherein the selection display includes a display memory and an alphanumeric visual display, and the selector includes a scroll control for selectively scrolling through the display memory to display sequentially at the alphanumeric display the plurality of items available for selection.

6. The invention of claim 1 wherein the selection display includes a display memory and an alphanumeric visual display, and the selector includes a scroll control for selectively scrolling through the display memory to display sequentially at the alphanumeric display the plurality of items available for selection and the quantities of such items available for selection.

7. The invention of claim 6 wherein the order information transfer device includes a transceiver for transmitting information pertaining to the compiled order to the provider site at the remote location and for receiving a confirmation of the placement of the confirmed order.

8. The invention of claim 7 wherein the transceiver is a radio frequency transceiver.

9. The invention of claim 1 wherein the provider site is located at a food service provider, and the items available for selection comprise food service items.

10. The invention of claim 9 wherein the food service provider is a restaurant, and the food service items comprise a restaurant menu.

11. An order selection debit card for placing an order compiled from selections available at the order selection debit card for subsequent filling of the order at a provider site placed at a remote location, the order selection debit card comprising:

a card body having an obverse face;

a display arrangement on the obverse face, the display arrangement including a selection display corresponding to a plurality of items available for selection and a plurality of quantities of each item available for selection, the selection display including a plurality of indicia on the obverse face of the card body;

a selector on the card body for choosing selected items and quantities from the available items and quantities, the selector including selector keys juxtaposed with corresponding indicia of the selection display for enabling the choice of the selected items and quantities from the plurality of items and quantities displayed by the indicia;

a value memory in the card body for storing information pertaining to a given value available in the card;

a compiler in the card body for compiling an order in response to the selector, in accordance with the selected items and quantities;

an order information transfer device in the card body for transferring order information pertaining to the compiled order from the card body to the provider site to place the compiled order;

a calculator in the card body for determining a compiled value of the compiled order based upon the selected items and quantities; and a comparator in the card body for comparing the compiled value to the given value available in the card to determine if the given value is sufficient to meet the compiled value for release of the compiled order to the order information transfer device, for releasing the compiled order to the information transfer device for placement of the compiled order upon determining that the given value is sufficient to meet the compiled value and, upon placement of the compiled order, to deduct the compiled value from the given value and establish in the value memory a current given value available in the card subsequent to placement of the compiled order;

the order information transfer device including a magnetic stripe on the card body and a magnetic converter for providing order information pertaining to the compiled order to the magnetic stripe.

12. The invention of claim 11 wherein the card body includes a reverse face, and the magnetic stripe is located on the reverse face.

13. A method for placing an order compiled from selections available at an order selection debit card for subsequent filling of the order at a providing site placed at a remote location, the method comprising:

providing a display arrangement on the card, the display arrangement including a selection display corresponding to a plurality of items available for selection and a plurality of quantities of each item available for selection;

selecting items and quantities from the available items and quantities;

storing information pertaining to a value available in the card in a value memory in the card;

compiling in the card an order in response to the selection of items and quantities, in accordance with the selected items and quantities;

determining a compiled value of the compiled order based upon the selected items and quantities;

comparing the compiled value to the given value available in the card to determine if the give value is sufficient to meet the compiled value for release of the compiled order and, upon determining that the given value is sufficient to meet the compiled value, placing the compiled order by releasing the compiled order for the transfer of order information pertaining to the compiled order from the card to the provider site at the remote location and receiving a confirmation of the placement of the confirmed order; and deducting the compiled value from the given value to establish in the value memory a current given value available in the card subsequent to placement of the compiled order and to receiving the confirmation of the placement of the confirmed order.

* * * * *